US006156430A

United States Patent [19]

Weber et al.

[11] Patent Number: 6,156,430

[45] Date of Patent: Dec. 5, 2000

[54] CERAMIC POWDER HAVING A SURFACE THAT HAS BEEN RENDERED HYDROPHOBIC AS WELL AS ITS MANUFACTURE AND USE

[75] Inventors: Lothar Weber; Ulrich Eisele, both of Stuttgart; Ruediger Nass, Riegelsberg, all of Germany

[73] Assignee: Robert Bosch GmbH, Stuttgart, Germany

[21] Appl. No.: 08/875,655

[22] PCT Filed: Jan. 17, 1996

[86] PCT No.: PCT/DE96/00051

§ 371 Date: Jul. 30, 1997

§ 102(e) Date: Jul. 30, 1997

[87] PCT Pub. No.: WO96/23744

PCT Pub. Date: Aug. 8, 1996

[30] Foreign Application Priority Data

| | | | |
|---|---|---|---|
| Jan. 31, 1995 | [DE] | Germany | 195 02 890 |
| Dec. 16, 1995 | [DE] | Germany | 195 47 183 |

[51] Int. Cl.[7] ....... B32B 5/16

[52] U.S. Cl. ....... 428/403; 427/220; 428/404

[58] Field of Search ....... 428/403, 404; 427/220

[56] References Cited

U.S. PATENT DOCUMENTS

| | | | |
|---|---|---|---|
| 4,454,237 | 6/1984 | Hoda et al. | 501/2 |
| 5,001,091 | 3/1991 | Pujari et al. | 501/103 |
| 5,106,608 | 4/1992 | Retschnig et al. | 423/635 |
| 5,127,325 | 7/1992 | Fadner | 101/348 |
| 5,344,799 | 9/1994 | Wu | 501/80 |
| 5,348,760 | 9/1994 | Parker et al. | 427/9 |
| 5,498,382 | 3/1996 | Seitz et al. | 264/56 |

*Primary Examiner*—H. Thi Le

*Attorney, Agent, or Firm*—Venable; George H. Spencer; Ashley J. Wells

[57] ABSTRACT

The invention essentially relates to the use of ceramic powders whose surface has been rendered hydrophobic to produce fine-particle dispersions having a high solids content and a low viscosity. The invention further relates to specific ceramic powders whose surface has been rendered hydrophobic, and methods of producing them. Ceramic powders whose oxidic surface has hydroxide groups possessing a basic or amphoteric character can be rendered hydrophobic, for example, through the effect of a hydrophobic carboxylic acid. Acidic oxides are rendered hydrophobic through treatment with metal-containing hydrophobing agents which are, however, also suitable for rendering ceramic powders hydrophobic that have a basic or amphoteric character.

18 Claims, 2 Drawing Sheets

Shearing stress (Pa)
50.00
37.50
25.00
12.50
0.00
Shearing speed (1/s)
0.00
37.50
75.00
112.50
150.00
1
2
3
4

CERAMIC POWDER HAVING A SURFACE THAT HAS BEEN RENDERED HYDROPHOBIC AS WELL AS ITS MANUFACTURE AND USE

BACKGROUND OF THE INVENTION

It is known that metal oxides usually have hydroxyl groups on their surface. This is particularly the case if the oxides have been produced in an aqueous medium through precipitation of the metal ions as hydroxides or hydrated oxides, and subsequent dehydration. Depending on the respective metal, the metal oxides can have a basic, acidic or amphoteric character, i.e., the hydroxide groups can gain or lose protons. Measuring the pH of an aqueous suspension of the oxide determines the basic, acidic or amphoteric character of an oxide. The quantity of hydroxide groups on the surface can be determined through acid/base titration.

The hydroxide groups lend the oxides a more or less pronounced hydrophilic character. In the production of dispersions comprising fine-particle oxides, the hydroxide groups appear on the surface of a certain oxide particle in attractive interaction with hydroxide groups on the surface of adjacent particles, thus effecting a certain cohesion of the particles that leads to agglomerations and reduces the dispersibility of the oxide particles. It is known that this effect can be counteracted by the addition of cationic or anionic dispersion agents. Depending on the respective metal, these agents generate positive or negative charges on the particle surface that counteract the agglomeration in a desired manner, but, at least in very fine-particle dispersions, lead to spacing between particles that can approach or even exceed the order of magnitude of the particle diameter due to Coulomb repulsion. It is therefore difficult or impossible to produce the commonly-desired dispersions with very small particle diameters, and yet high solids contents.

SUMMARY OF THE INVENTION

With the invention, ceramic powders are created whose surfaces have been rendered hydrophobic and are particularly suited for producing stable dispersions (so-called ceramic slips) that have very small average particle sizes and a high solids content, as are required for high-quality molded bodies produced in accordance with a sintering method. The reason for this is that, because of the steric stabilization effected by the hydrophobing process of the invention, the particles require less space in comparison to those subjected to electrostatic stabilization by means of cationic or anionic dispersion agents. Therefore, the ceramic powders that have been rendered hydrophobic in accordance with the invention can be used to produce stable dispersions having a higher solids content and the same viscosity, or a lower viscosity with the same solids content, in comparison to electrostatically-stabilized dispersions. Extremely-fine ceramic powders can be processed only into reasonably processable dispersions if they have been rendered hydrophobic in accordance with the invention.

Rendering ceramic powders of different origins hydrophobic results in an evening-out of the properties, that is, masking or suppression of certain characteristics stipulated by origin that would otherwise cause a different behavior. Thus, ceramic powders of different origins and having different properties can be processed in the same manner. The course of further processing is therefore independent of the individual properties of the raw materials.

In the dried ceramic green bodies, rendering the surface of the powder particles hydrophobic results in an increased flexibility that is desirable for different applications.

Moreover, ceramic slips produced from ceramic powders that have been rendered hydrophobic according to the invention, and are therefore sterically stabilized, have no yield point, or a considerably lower yield point, in comparison to electrostatically-stabilized slips under otherwise identical conditions, which is advantageous for further processing of the slips.

DESCRIPTION OF THE PREFERRED EMBODIMENT

Figure 1:
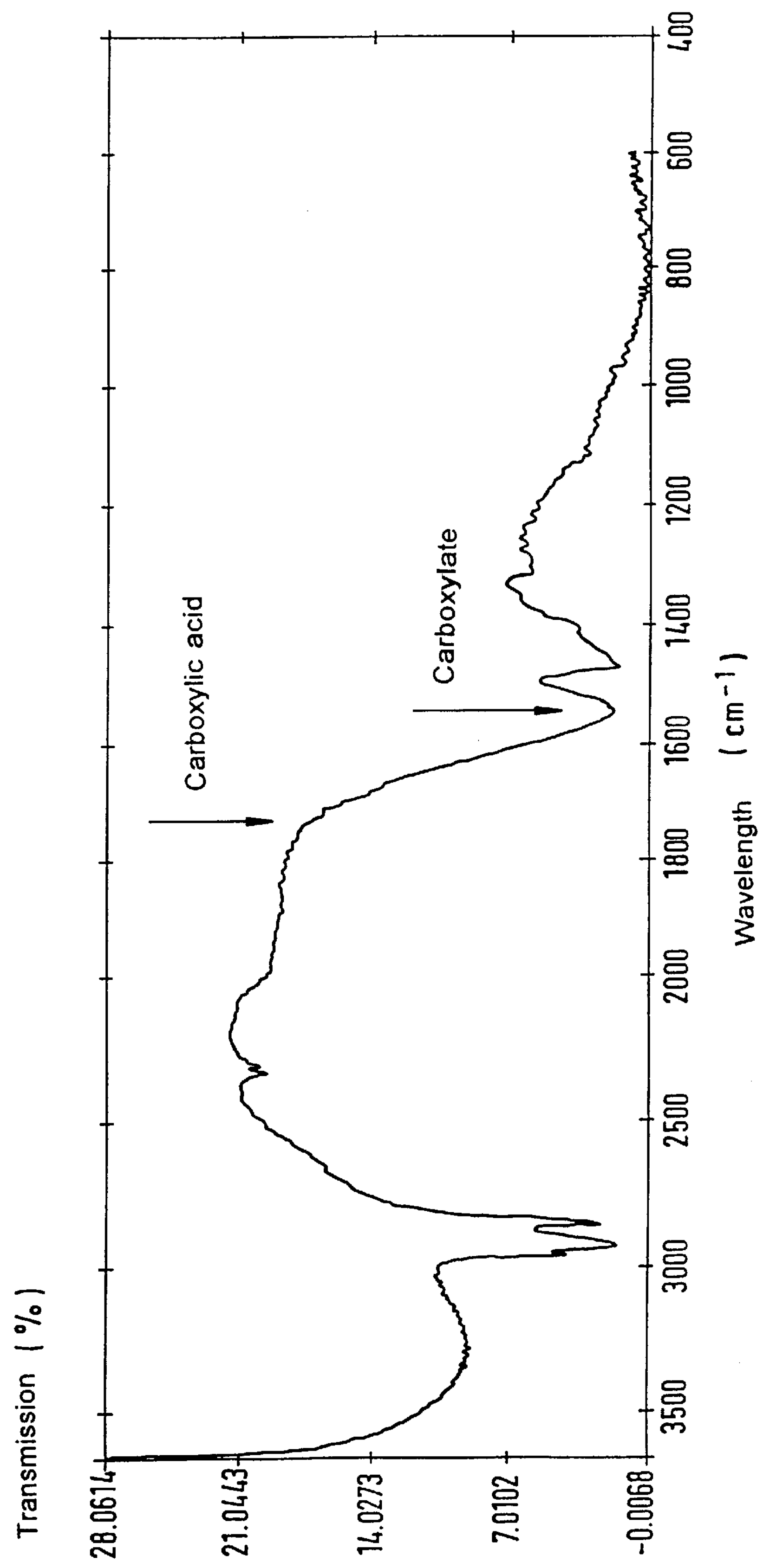
FIG. 1 illustrates the IR spectrum of a zirconium dioxide that has been rendered hydrophobic with palmitic acid.

The essential concept of the invention lies in using ceramic powders whose surfaces have been rendered hydrophobic to produce dispersions having average particle sizes in the micrometer and nanometer range and a high solids content, thereby achieving the described advantages. Ceramic powders produced in accordance with the methods of the present invention, are especially well-suited for producing such dispersions.

1. The Ceramic Powders Whose Surface Has Been Rendered Hydrophobic

The ceramic powders whose surfaces were rendered hydrophobic in accordance with the invention comprise particles corresponding to the formula $$P-(XR)_m, \qquad \text{I}$$

where P represents a ceramic powder particle; R a hydrophobic, organic residue; X represents a binding link that binds the hydrophobic, organic residue R to the ceramic powder particle KP; and m stands for a whole number >1.

1.1 The Ceramic Powder Particles P

The ceramic powder particles P comprise either (1) an oxidic ceramic material having surface-bound hydroxide groups or (2) a non-oxidic ceramic material that nevertheless has an oxidic surface with hydroxide groups. The materials (2) can also be characterized as non-oxidic ceramic materials having an oxidic skin; it should not be said, however, that this oxidic skin is necessarily cohesive. The oxidic or non-oxidic materials (1) and (2) are characterized as ceramic materials if they can be sintered together at high temperatures to form ceramic bodies.

The oxidic ceramic materials (1) are derived from monovalent or multivalent elements that can form oxides having a basic, acidic or amphoteric character, depending on whether the hydroxide groups on the surface tend to gain or lose protons, or are able to gain and lose protons. It is well-known which oxides exhibit basic properties, and which exhibit acidic or amphoteric properties. In case of doubt, the character of an oxide can be determined by measuring the pH of an aqueous suspension of the oxide powder. If the pH is about 7, the relevant oxide has an amphoteric character in the sense of the invention. If the pH is <7, the oxide has an acidic character, and a pH >7 indicates an oxide having a basic character. It must be kept in mind here that, as dictated by their production, some oxides can contain surface-bound contaminants that skew the measurement results. For example, so-called pyrogenic oxides obtained through the burning of metal halogenides typically contain halogenide residues that form hydrogen chloride through hydrolysis, which falsely indicates an oxide of acidic character in a pH measurement. Therefore, a suspension of commercially-available pyrogenic zirconium dioxide powder exhibits a pH of about 3. If the powder is washed with diluted ammonia water prior to washing, and rinsed thoroughly with water afterward, the pH is about 7. Zirconium dioxide is correspondingly an amphoteric oxide in the sense of the invention.

Examples of oxides possessing a basic character include magnesium oxide, zinc oxide and copper oxide (CuO). Oxides having an acidic character that are suited for the invention include silicon dioxide, germanium dioxide and boron trioxide ($B_2O_3$). Suitable oxides having an amphoteric character are, for example, aluminum oxide, zirconium dioxide, titanium dioxide, hafnium dioxide and yttrium oxide ($Y_2O_3$). The surfaces of mixtures of oxides or oxide compounds, for example spinels and perovskites, can also be rendered hydrophobic in accordance with the invention.

The suitable, non-oxidic ceramic materials (2) particularly include carbides, nitrides, borides and silicides that form an oxidic surface having hydroxide groups. Suitable carbides are covalent carbides, such as silicon carbide and boron carbide, as well as metal-like carbides, such as tungsten carbide, titanium carbide and vanadium carbide. Suitable nitrides include covalent nitrides such as boron nitride, silicon nitride and aluminum nitride. Examples of suitable borides are aluminum boride, zirconium boride and tungsten boride. The oxidic surfaces having hydroxide groups may be derived from only one of the components forming the carbide, nitride, boride or silicide.

For example, $SiO_2$ structures having hydroxide groups are found on silicon carbide. The properties of the oxidic surfaces of the non-oxidic ceramic powders (2), and particularly the ability of the powders to be rendered hydrophobic according to the method of the invention, correspond to those of the surfaces of the materials described above, that is, oxidic ceramic materials derived from the same oxide-forming agent. All of the related explanations therefore also apply for the non-oxidic ceramic powders (2).

Preferred ceramic powders (1) and (2) have fine particles. Within the scope of the present invention, this means that their average particle diameter is within the micrometer or nanometer range. It is generally 5 nm to 5 Am, advantageously 10 nm to 1 $\mu$m.

1.2 The Hydrophobic. Organic Residue R

In Formula I, R stands for a hydrophobic, organic residue, that is, for a substituent possessing an exclusive or predominant hydrocarbon structure. It advisably contains at least 6, advantageously at least 8 and up to 36 carbon atoms. Preferred residues R contain 10 to 20 carbon atoms. The hydrophobic, organic residues R can have a saturated or unsaturated hydrocarbon structure, for example. These residues include alkyl residues, cycloalkyl residues, aryl residues, aryl alkyl residues or alkyl aryl residues. They can, however, also be unsaturated, such as alkenyl or alkadienyl residues. Examples of considered residues include octyl, dodecyl, hexadecyl, octadecyl, tricosyl, 8-hexadecenyl, 9-octadecenyl, cyclododecyl, cyclododecenyl, octylphenyl and phenyldodecyl. The residues R can, however, also contain, in smaller amounts, groups or atoms that do not impair its hydrophobic character significantly or at all, and are inert under the conditions of the hydrophobing method. Examples include ether bridges, sulfide bridges and halogen atoms.

1.3 The Binding Link X

The binding link X in Formula I can be, for example, a carboxylate residue

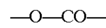

—O—CO— II which, along with the residue R, forms a hydrophobic carboxylic acid residue (or acyl residue)

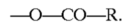

—O—CO—R. III

The carboxylic acid residues III are particularly found on ceramic powders having oxidic surfaces that possess a basic or amphoteric character. They are generally derived from saturated or olefinic, unsaturated, aliphatic carboxylic acids having at least 7, advantageously 9 to 37 and particularly 11 to 21 carbon atoms. Examples of carboxylic acid or acyl residues III include the residues derived from hexanoic acid, octanoic acid, decanoic acid, dodecanoic acid (lauric acid), myristic acid, palmitic acid, oleic acid, linoleic acid, stearic acid, arachidic acid and melissic acid. Aside from the carboxyl group, the carboxylic acids can have a saturated or unsaturated hydrocarbon structure, or contain the above-mentioned groups or substituents, which are inert under the conditions of the hydrophobing method and do not impair the hydrophobic character of the substituent R notably or at all. However, fatty acids having 10 to 18 carbon atoms and the corresponding olefinic, unsaturated, carboxylic acids are particularly preferred.

The binding link X in Formula I can also have the formula

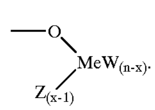

IV

In this formula, Me represents a multivalent, advantageously bivalent to tetravalent, metal atom, and n represents its valency. Examples include magnesium, beryllium, aluminum, gallium, tin, germanium, silicon, zirconium, yttrium and hafnium atoms. In this instance, Me can correspond to the metal whose oxide forms the oxidic surface of the ceramic powder particles. The metals can, however, also be different; for example, a zirconium dioxide surface can have hydrophobic residues with binding links of Formula IV, in which Me represents aluminum. In Formula IV, x stands for a whole number from 1 to (n−1). With a multiple occurrence, Z can be identical or different, and stands for —O, OH or the residue OR', in which R' represents an organic residue having 1 to 6 carbon atoms, particularly an alkyl residue having 1 to 4 carbon atoms. Finally, W can, again with a multiple occurrence, be identical or different, and means $R^1$, the grouping —O—CO— or a metal-carbon bond (to the residue R in Formula I), with the measure that at least one substituent W represents a grouping —O—CO— or a metal-carbon bond. If present, $R^1$ represents an organic residue that generally has a hydrocarbon structure having 1 to 36 carbon atoms, advantageously 1 to 20 carbon atoms.

Examples for hydrophobic residues that contain binding links of Formula IV are —O—Zr(O—i—$C_3H_7$) (O—CO—$C_{15}H_{31}$)$_2$, —O—Al (O—i—$C_3H_7$) (O—CO—$C_{15}H_3$,), —O—Al(OH) (O—CO—$C_{17}H_{35}$), —O—Al(O—i—$C_3H_7$) (O—CO—$C_{17}H_{33}$), —O—Al (O—CO—$C_{15}H_{31}$)$_2$, —O—Si(OH)$_2$ ($C_{12}H_{25}$), (—O) $_2$Al (O—CO—$C_{17}H_{35}$) —O—Al ($C_{12}H_{25}$) (O—CO—$C_{17}H_{35}$), —O—Si($CH_3$)$_2$ ($C_{18}H_{37}$), -Y(i—$C_3H_7$) (OCOC$_{15}H_3$,) and (—O)$_2$Zr (O—CO—$C_{15}H_{31}$)$_2$.

1.4 The Number of Hydrophobic Residues

In Formula I, m stands for a whole number >1 that represents the number of hydrophobic residues -XR on a powder particle. Because the ceramic powders have a distribution of particle size, m represents an average value related to the average particle size. Moreover, m is an element-specific value that reflects the different tendencies of the different oxide-forming elements to form hydroxide groups on the oxidic surface. The value of m can be calculated from the specific surface of the ceramic powder (determined, for example, through laser backward scattering), the mass content of organic material in the ceramic powder that has been rendered hydrophobic (determined, for example, through thermogravimetric analysis) and the molecular mass of the hydrophobing groups -XR. The exact value of m is not crucial for the invention. Instead, the formulation "whole number>1" is intended to express that the ceramic powder particles have a varying, but very large, number of hydrophobing groups on their surface whose surface concentration is generally in a range of 0.5 to 50 $\mu$moles/$cm^2$.

2. The Production of Powders Having a Hydrophobic Surface

The ceramic powder particles whose oxidic surface with hydroxide groups are treated with a hydrophobing agent for producing the ceramic powders to have a hydrophobic surface. The number of hydroxide groups per powder particle of average particle size is at least m, but is usually larger, because not all of the present hydroxide groups react with the hydrophobing agent for steric or other reasons. The quantity of present hydroxide groups can be calculated, for example, from a determination of the active hydrogen atoms in the hydroxide groups of a specific powder quantity and the average powder particle size. The active hydrogen atoms can be determined, for example, through the effect of lithium aluminum hydroxide on the ceramic powder carefully freed from adhering water. Like the surface concentration of the hydrophobing groups in the ceramic powders that have been rendered hydrophobic, the surface concentration of the hydroxide groups is generally in a range of 0.5 to 50 $\mu$moles/$cm^2$. In any event, the ceramic powders typically used for sintering methods contain a sufficient surface concentration of hydroxide groups for the hydrophobing process associated with the above-described advantages.

2.1 The Hydrophobing Process with Acylation Agents

A crucial consideration in the selection of the hydrophobing agent is whether the oxidic surfaces of the powder particles have a basic, acidic or amphoteric character. Acylation agents that produce the carboxylic residues of Formula III are particularly suited for ceramic powders having an oxidic surface of basic or amphoteric character. As mentioned above, contaminants from the production process of the powders can give a false indication of an acidic character, and therefore should be removed if an acylation agent is to be used for the hydrophobing. Ceramic powders whose oxidic surface has a basic or amphoteric character can be acylated and thus rendered hydrophobic through the heating of the ceramic powder during the return flow in a solution of a carboxylic acid of the formula $$\text{R—COOH,} \qquad \text{V}$$

in which R has the meaning disclosed above, in an inert solvent having a low solvency for water. The quantity of carboxylic acid should be at least equivalent to the quantity of hydroxide groups present on the surface of the ceramic powders. An excess, for example up to over 100% above the quantity necessary for acylation, causes no harm, however.

Suitable solvents having a low solvency for water include aliphatic and aromatic hydrocarbons such as n-octane, isooctane, cyclohexane, toluene and xylene. They serve simultaneously as entraining agents for the water resulting during acylation, which is separated out in a standard manner while the solvent is being returned.

Similarly, the corresponding carboxylic acid anhydride can be used in place of a carboxylic acid. Moreover, a carboxylic acid ester, advisably with an alcohol having 1 to 4 carbon atoms, such as methanol, can serve as an acylation agent. In this instance, the relevant alcohol is removed from the system. Finally, there is the acylation of the hydroxide groups on the surface of the oxide by means of carboxylic acid halogenides, in which a tertiary amine such as triethylamine or pyridine is added to capture the resulting halogen hydrogen.

2.2 The Hydrophobing Process with Metal-Containing Hydrophobing Agents

Surprisingly, the disclosed acylation agents break down in the hydrophobing of ceramic powders having an oxidic surface of acidic character, for example the surface of $SiO_2$ particles. With these agents, no notable change takes place in the properties of the ceramic powders. Oxides having an arbitrary, i.e., basic, amphoteric or even acidic surface, can, however, be rendered hydrophobic in that the corresponding ceramic powder is treated with a metal-containing hydrophobing agent of the formula $$(R'O)_x MeY_{(n-x)}, \qquad \text{VI}$$

yielding hydrophobing residues on the surface that have a binding link IV. In Formula VI, Me, R', n and x have the meaning disclosed in connection with Formula IV, and Y stands for identical or different residues $R^1$ or O—CO—R, with R' having the meaning listed in connection with Formula IV and R having the meaning listed for Formula I, with the measure that the hydrophobing agent VI has at least one hydrophobic, organic residue $R^1$ or O—CO—R, in which $R^1$ and R contain at least 6 carbon atoms.

Hydrophobing agents of Formula VI are usefully produced through the conversion of a metal alkoxide or organometallic alkoxide of the formula $$R^2_y Me(OR')_{(n-y)} \qquad \text{VII}$$

with 1 to (n−y−1) moles carboxylic acid R-COOH. V

In Formula VII, Me and R' have the meanings explained in connection with Formula IV; $R^2$ indicates an organic residue that generally has a hydrocarbon structure containing 1 to 36 carbon atoms, advantageously 1 to 18 carbon atoms; and y stands for 0 or a whole number from 1 to (n−y−1). $R^2$ corresponds to the substituent $R^1$ as explained in connection with Formula IV, but, unlike $R^1$, does not stand for —O—CO—R.

The compound VII is converted with less than the stoichiometric quantity of a carboxylic acid V corresponding to the alkoxyl groups OR', with the quantity of acid reacting with an alkoxyl group OR', namely in that the alcohol is split and one or a plurality of residues —O—CO—R is inserted into the molecule VII. Thus, at least one alkoxyl residue OR' is retained. The reaction takes place quickly, and generally ends after 60 to 100 minutes. It advantageously occurs in an inert solvent, such as the ones described above, at a temperature between 50° C. and the boiling temperature of the solvent. Depending on the valency n of the metal Me and the molar quantities of VII and V, hydrophobing agents VI are obtained in which the metal atom supports an alternating number of alkoxide residues OR', organic residues RI and/or carboxylic acid residues —OCO—R.

In the absence of water, the alkoxyl groups OR' remaining in the hydrophobing agents VI react readily, namely in that an alcohol molecule R'OH splits, with the hydroxyl groups present on the surface of the oxides, including the acidic oxides. The reaction can be performed by allowing the hydrophobing agent VI to act on the surface of the ceramic powder particles, preferably as a reaction mixture, as is obtained through the conversion of the metal alkoxide or organometallic alkoxide VII with the carboxylic acid V in an inert solvent, at temperatures that are, again, advantageously between 50° C. and the boiling temperature of the solvent. This reaction generally requires 30 to 180 minutes.

Depending on the special hydrophobing agent and the steric relationships on the surface of the powdered oxides having hydroxyl groups on their surface, only one or a plurality of chemical bonds forms between a molecule of the hydrophobing agent and a powder particle. As long as alkoxyl residues OR' remain, which have no opportunity to react with a hydroxyl group of a powder particle, they can hydrolyze into a hydroxyl group in the subsequent production of the aqueous dispersion (that is, the ceramic slip). Correspondingly, the metal binding link Z stands for —O, —OH or —OR' in Formula IV.

In the hydrophobing process, Me can correspond to the metal whose oxide forms the surface of the ceramic powder particles. The metals, can, however, also be different, as mentioned above. The two variations are the method of the selection in ceramic powders having an oxidic surface of acidic character, as discussed above. However, ceramic powders having an oxidic surface are also rendered hydrophobic in this way. At first glance, a hydrophobing process involving simple acylation appears more desirable, because it can be performed with the very-accessible carboxylic acids. On the other hand, in the use of metal-containing hydrophobing agents VI, a higher charge of the surfaces is often achieved with organic material, which can be advantageous under certain circumstances.

3. Properties of the Ceramic Powders That Have Been Rendered Hydrophobic

Each of the described methods yields ceramic powders whose oxidic surface has been rendered hydrophobic, and on which the hydrophobing residues are chemically bonded. This occurs, among other reasons, because no carboxylic acid or other organic components can separate from the surfaces treated with the described hydrophobing agents, even with boiling toluene. Moreover, the IR spectrum of the surfaces that have been rendered hydrophobic exhibits no peak that corresponds to a free carboxyl group, but rather a pronounced peak that is characteristic for a carboxylate group. In rendering oxidic surfaces of basic or amphoteric character hydrophobic through treatment with an acylation agent, carboxylate structures of the formula

VIII

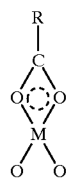

can form on the surface, with M representing a metal atom (possibly different from Me) of the ceramic powder and R having the meaning disclosed for Formula I. The carboxylate peak is indicated in FIG. 1, as is the point at which the carboxylic-acid peak would have to appear.

In a hydrophobing process involving a compound of Formula VII, structures of the formula

IX

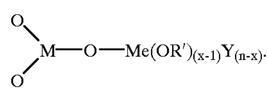

XI

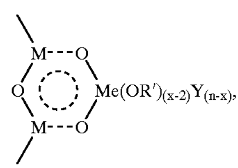

among others, could form on the surface. In Formulas IX and XI, M, Me, R' and Y have the above-disclosed meanings. However the binding mechanism may function in an individual case, the hydroxide groups on the oxidic surface of the ceramic powders can be completely removed or, in any event, masked to the point that they demonstrate no external effect on other powder particles or the surrounding medium.

The behavior during dispersion of the ceramic powders that have been rendered hydrophobic also indicates that the hydrophobic residues R adhere fixedly to the oxidic surface by way of the binding link X, and the hydrophobic hydrocarbon ends are oriented away from the surface and into the surrounding medium. For palmitic acid or oleic acid, a surface coverage of 35–45 $Å^2$ per molecule is calculated from thermogravimetric analysis and the specific powder surface.

4. Use of Ceramic Powders Whose Surface Has Been Rendered Hydrophobic

Ceramic powders whose surface has been rendered hydrophobic, including the ceramic powders whose surface has been rendered hydrophobic in accordance with the invention, are particularly suited for producing dispersions comprising very small powder particles, for example having average particle diameters of <0.3 $\mu$m, and yet having a high solids content. This is especially significant for nanodisperse ceramic dispersions having an average particle size of 5 to 300 nm. When these dispersions are stabilized with anionic or cationic dispersion agents, the mutual repulsion of the particles due to the same-direction Coulomb forces results in particle spacings of 50–100 nm, which only permit undesirably-low solids contents to be established. In contrast, with the use of correspondingly fine-particle ceramic powders whose surface has been rendered hydrophobic, the dispersions are sterically stabilized, that is, the particle-particle spacing is essentially determined by the relative density of the monomolecular hydrophobing-residue layer. It is therefore possible, for example, to produce stable aqueous $Al_2O_3$ or $ZrO_2$ dispersions having average particle diameters of 20 to 300 nm and solids contents of 30 to 60 percent by volume. These dispersions have a surprisingly low viscosity for the high solids content, generally between 50 and 1,000 mPa.

To produce the dispersions, the necessary quantity of water and, usefully, a non-ionic surfactant, are added to the oxide powder whose surface has been rendered hydrophobic, and the mixture is exposed to shearing forces. This can be effected in a stirrer vessel, a kneader or a ball mill. In many instances, it is recommended to also use a water-soluble, organic solvent, such as n-octanol, ethanol, i-propanol, n-butanol or acetylacetone, in a quantity smaller than the water.

A surprising advantage of the hydrophobing process of the invention is that oxides of different origin and having different past histories behave practically identically after the hydrophobing process, even if they exhibit distinct differences in properties, with practically identical macroscopic data, in processing into microdispersions or nanodispersions. This facilitates the execution of further processing, and leads to readily-reproducible properties of the produced sintered bodies.

The dispersions are processed in a conventional manner. If sintered bodies are produced from the dispersions, the content of organic material, which is based on the hydrophobing and, depending on the degree of fineness of the oxide powder, can be up to a few percent by weight, is non-problematic. Rather, the organic material is practically completely removed, like the organic plastification and binding agents used frequently in the sintering technique, through careful heating to temperatures of 150 to 400° C. in an oxygen-containing atmosphere.

The following examples are intended to explain, but in no way limit, the invention.

EXAMPLE 1

Rendering $ZrO_2$ Hydrophobic with a Carboxylic Acid

The initial product is a ceramic $ZrO_2$ powder having a specific surface of 50 $m^2/g$. The particle sizes, determined by laser backward scattering, are in a range of 80 to 250 nm, with an average value of 140 nm. First, 0.1 moles palmitic acid are stirred and heated to dissolving in 1,000 ml n-octane. Then 0.8 moles $ZrO_2$ are added to the solution. The suspension of $ZrO_2$ in the palmitic acid solution that is obtained in this manner is heated for 3 hours during the return flow; the water that results during the reaction of the hydroxide groups on the surface of the ceramic powder with the palmitic acid is separated out with the aid of a water separator. After the reaction has ended, the ceramic powder is centrifuged off, re-suspended in n-octane, centrifuged off again and dried at 90° C. in a vacuum. The yield is 95 mass percent.

The ceramic powder is now completely hydrophobic, and can only be introduced into water with the aid of a non-ionic surfactant. The particle-size distribution is unchanged with respect to the initial product. Thermogravimetric analysis (TGA) reveals an organic material component of 6 mass percent. This corresponds to a surface coverage of 35 $Å^2$ per molecule of palmitic acid.

Analogous results are obtained if the palmitic acid is replaced by an equimolar quantity of oleic acid and/or the n-octane is replaced by the same weight quantity of toluene.

EXAMPLE 2

Rendering $ZrO_2$ Hydrophobic with a Metal Alkoxyl Carboxylate 2.1 Production of Aluminum Isopropylate Carboxylate First, 9 g (0.05 moles) aluminum triisopropylate are dissolved in 100 ml toluene. Then, 0.1 moles palmitic acid are heated slightly to dissolving in toluene. The solution, being stirred and heated, is dripped into the solution of aluminum triisopropylate. Afterward, the mixture is heated for 5 hours during the return flow, with the resulting isopropanol being distilled off. Aluminum isopropylate dipalmitate having the formula $(C_3H_7O)Al(OCO—C_{15}H_{31})_2$ results.

2.2 Production of Zirconium Isopropylate Palmitate

The production is effected analogously to the production of aluminum propylate palmitate under 2.1, with 10 g (0.05 moles) zirconium tetraisopropylate being used. The result is zirconium diisopropylate dipalmitate, $(i—C_3H_7O)_2Zr(OCO—C_{15}H_{31})_2$.

2.3 Rendering $ZrO_2$ Hydrophobic

The initial product is the $ZrO_2$ used in Example 1. The volumes of the hydrophobing agents under 2.1 and 2.2 are respectively increased to 1,000 ml by the addition of more toluene. Then 0.8 moles $ZrO_2$ are introduced into both solutions. The mixtures are each heated for about 3 hours during the return flow; the resulting isopropanol distills off. After the reaction has ended, the ceramic $ZrO_2$ powder, which is now hydrophobic, is centrifuged off, suspended in toluene, centrifuged off again and dried in a vacuum-drying chamber at 90° C. until it reaches constant weight. The properties of the dried ceramic powder essentially correspond to those of the ceramic $ZrO_2$ powder rendered hydrophobic in Example 1. According to thermogravimetric analysis, the organic material component is 7.5 mass percent.

EXAMPLE 3

Production of Aqueous Ceramic Slips 3.1 Slip Comprising Unmodified $ZrO_2$

Without the addition of dispersion agents, the unmodified, commercially-available $ZrO_2$ powder used in Example 1 can only be introduced into water up to a solids content of 18 percent by volume. If 5 mass percent—with respect to the powder—acetylacetone is added to the water prior to the addition of the powder, the solids content can be increased to 21 percent by volume. The slips are produced by successively stirring the powder into the provided water or mixture of water and acetylacetone. Attempts to increase the solids content above the disclosed values result in gelatinization, and thus a rigid slip.

3.2 Slip Comprising $ZrO_2$ That Has Been Rendered Hydrophobic

In the use of ceramic powders of Examples 1 and 2 that have been rendered hydrophobic, the solids content of the ceramic slip can be increased to 38 percent by volume. First, 10.9 g powder are successively stirred into 5 ml water containing 0.6 g of a non-ionic surfactant having an HLB (Hydrophilic-Lipophilic Balance) value between 12 and 15, and 0.3 g isopropanol as a co-surfactant. The result is a thin slip suitable for pouring. The particle-size distribution, determined by laser backward scattering, is unchanged with respect to the initial powder.

EXAMPLE 4

Rendering $Al_2O_3$ Hydrophobic with a Carboxylic Acid

The initial material is a commercially-available $Al_2O_3$ powder having a specific surface of 12.43 $m^2/g$ and an average particle size of 260 nm. First, 20.55 ml oleic acid are stirred into 1,200 ml n-octane. Then 450 g $Al_2O_3$ are stirred into the mixture. The resulting suspension is heated for 4 hours during the return flow. The water that results during the reaction of the OH groups on the surface of the ceramic powder with the oleic acid is separated out with the aid of a water separator. After the reaction has ended, the powder is centrifuged off a total of three times and washed twice between centrifuging with n-octane. Then the powder is dried for 7 hours at 95° C. in a vacuum.

The powder is now completely hydrophobic, that is, it can only be introduced into water with the aid of a non-ionic surfactant. The particle-size distribution is unchanged with respect to that of the initial powder. TGA reveals an organic-component proportion of 1.3 mass percent. From this, a surface coverage of 45 $Å^2$ per molecule of oleic acid is calculated.

EXAMPLE 5

Production of an Aqueous Slip from $Al_2O_3$ That Has Been Rendered Hydrophobic

Successively stirring 2,000 g (=500 ml) of $Al_2O_3$ powder that has been rendered hydrophobic into 500 ml of a mixture of 430 ml water, 52.5 ml of a non-ionic surfactant having an HLB between 12 and 15, and 17.5 ml isopropanol yields a thin slip suitable for pouring.

Figure 2:
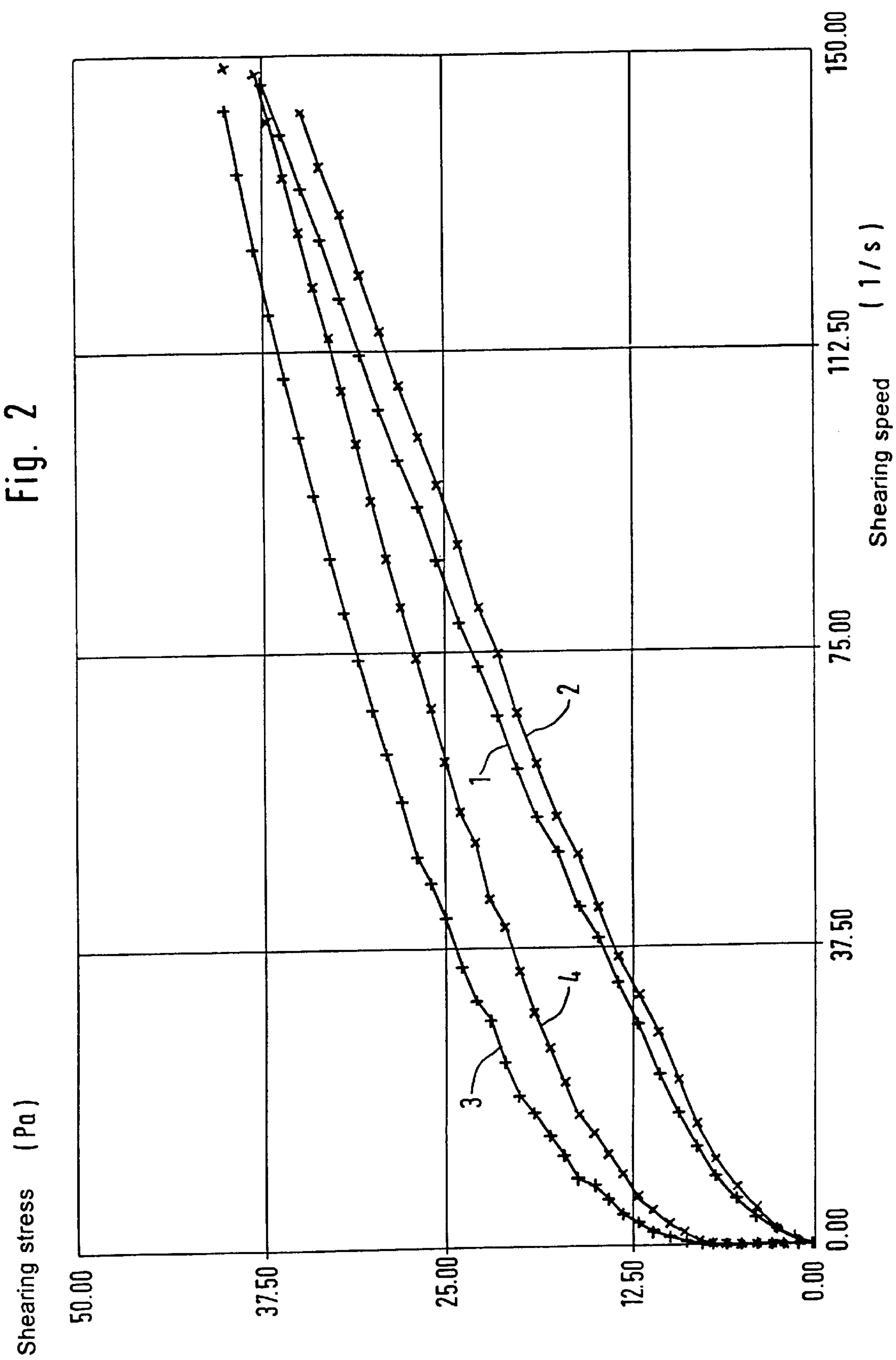
FIG. 2 shows flow curves of ceramic slips produced from aluminum oxide that has been rendered hydrophobic in accordance with the invention (indicated by (1) and (2)) and, for comparison, flow curves of ceramic slips having the same solids content and produced from the corresponding, but not hydrophobic, aluminum oxide, (indicated by (3) and (4)).

FIG. 2 shows a comparison of the flow curves of a slip (1) and (2) produced with these methods with the flow curves of a slip (3) and (4) of the same initial powder, likewise having a 50 volume percent solids content but stabilized electrostatically according to the state of the technology (J. Cesarano III, I. A. Aksay, Processing of Highly Concentrated Aqueous α-Alumina Suspensions Stabilized with Polyelectrolytes, J. Am. Ceram. Soc. 71 [12] (1988), 1062–1067). A notable difference is that, in the slips produced in accordance with the invention, there is no yield point, which is an important advantage for processing.

EXAMPLE 6

Production of Hydrophobic SiC

The initial powder has a specific surface of 40.3 $m_2$/g and an average particle size of 200 nm. In a three-necked plunger, 2,000 ml toluene and 97 g octadecyl trimethoxysilane (OTS) are mixed with a blade agitator. The mixture is heated during the return flow, and 722 g of the SiC powder are added gradually. The methanol resulting in the reaction of the OTS with the hydroxyl groups on the oxidic surface of the SiC powder is captured and carried off. The reaction has ended after 5 hours. The reaction mixture is filtered through a fourth-frit while still hot in order to separate the powder and solvent. The powder is washed on the frit with a total of 1,000 ml toluene, dried overnight in the drying chamber, ground by hand with a mortar and pestle and subsequently sifted through a 160-μm sieve. The OTS quantity to be used is calculated such that exactly one molecule of OTS is available for each hydroxide group on the surface (8.9 μmoles/$cm^2$).

What is claimed is:

1. A ceramic powder whose surface has been rendered hydrophobic, comprising:

particles whose surface contains hydroxyl groups and has been changed by a chemical reaction with an agent effective to render the surface hydrophobic, the particles corresponding to formula (I) as follows:

$$P\text{–}(XR)_m \quad \text{(I)}$$

wherein P stands for a ceramic powder particle having an average particle size of less than 300 nm and being comprised of one of (a) an oxidic ceramic material or (b) a non-oxidic ceramic material having an oxide skin; R represents a hydrophobic, organic residue; X represents a binding link that is chemically bonded to the ceramic powder particle P; and m stands for a whole number >1.

2. The ceramic powder according to claim 1, wherein R represents a hydrophobic, organic residue having from 9 to 40 carbon atoms.

3. The ceramic powder according to claim 1, wherein the ceramic powder has a character which is one of basic or amphoteric, and wherein the binding link X is a carboxyl residue having a formula —O—CO—.

4. The ceramic powders according to claim 1, wherein R represents a carbon residue having 8 to 36 carbon atoms.

5. A ceramic powder whose surface has been rendered hydrophobic, comprising:

particles whose surface contains hydroxyl groups and has been changed by a chemical reaction with an agent effective to render the surface hydrophobic, the particles corresponding to formula (I) as follows:

$$P\text{–}(XR)_m \quad \text{(I)},$$

wherein P represents a ceramic powder particle; R represents a hydrophobic, organic residue; X represents a binding link that is chemically bonded to the ceramic powder particle P; and rn stands for a whole number >1, and wherein the binding link X is a metal-containing residue of formula (IV):

$$\begin{matrix} —O \\ & \diagdown \\ & & MeW_{(n-x)}, \\ & \diagup \\ Z_{(x-1)} \end{matrix} \quad \text{(IV)}$$

where Me represents a multivalent metal atom and D represents its valency; x represents a whole number from 1 to (n−1); with a multiple occurrence, Z, which may be identical or different, and represents one of —O, —OH, or the residue —$OR^1$, in which $R^1$ represents an organic residue having 1 to 6 carbon atoms; and W may, again with a multiple occurrence, be identical or different, and represents one of $R^1$, a grouping —O—CO—, or a metal-carbon bond to the residue R, in which at least one substituent W represents a grouping —O—CO— or a metal-carbon bond to the residue R, and $R^1$ is optionally present and represents an organic residue.

6. The ceramic powder according to claim 5, wherein the multivalent metal atom Me corresponds to a primary constituent of the ceramic powder.

7. The ceramic powder according to claim 5, wherein the multivalent metal atom Me is different from a primary constituent of the ceramic powder.

8. The ceramic powder according to claim 5, wherein the ceramic powder comprises an oxidic ceramic material.

9. The ceramic powders according to claim 5, wherein the ceramic powder comprises a non-oxidic ceramic material having an oxide skin with an oxidic surface having hydroxide groups thereon.

10. The ceramic powders according to claim 5, wherein R represents a carbon residue having 8 to 36 carbon atoms and $R^1$ represents a hydrocarbon residue having 1 to 36 carbon atoms.

11. The ceramic powder according to claim 5, wherein R represents a hydrophobic, organic residue having from 9 to 40 carbon atoms.

12. A method of producing a ceramic powder whose surface has been rendered hydrophobic, comprising:

providing ceramic particles comprising one of (a) an oxidic material or (b) a non-oxidic material having an oxide skin, having a hydrophobic surface which has a character which is one of basic or amphoteric and which has hydroxyl groups bonded thereto, heating the ceramic particles in an inert solvent which is immiscible with water and with an acylating agent that reacts chemically with the hydroxyl groups bonded to the hydrophobic surface thereof so that a reaction product is released and an acyl residue forms on the surface of the ceramic powder particles and has a formula (III) as follows:

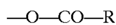

$$—O—CO—R \quad (III),$$

with R representing a hydrophobic, organic remainder having 6 to 36 hydrogen atoms; and continuously carrying off the released reaction product by hetero-azeotropic distillation.

13. The method according to claim 12, wherein the acylating agent that produces an acyl residue having formula (III) is selected from the group consisting of a carboxylic acid, a carboxylic acid anhydride, a carboxylic acid ester, and a carboxylic acid halogenide.

14. The method according to claim 13, wherein the carboxylic acid is a saturated or olefinic, unsaturated, aliphatic carboxylic acid having 9 to 37 carbon atoms.

15. The method according to claim 12, wherein the ceramic powder comprises zirconium dioxide.

16. A method of producing ceramic powders whose surface has been rendered hydrophobic, comprising:

providing ceramic powder particles having a character which is one of acidic, basic or amphoteric and having hydroxyl groups on the surface thereof; and reacting the hydroxyl groups with an agent which is effective to render the surface hydrophobic, which contains metal, and which has a formula as follows:

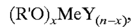

$$(R'O)_x MeY_{(n-x)},$$

where Me represents a multivalent metal atom, n represents its valency; x represents a whole number from 1 to (n−1); R' represents an organic residue having 1 to 6 carbon atoms; and Y stands for identical or different residues $R^1$ or —O—CO—R, with $R^1$ representing an organic residue and R representing a hydrophobic, organic residue, and where the agent which is effective to render the surface hydrophobic contains at least one hydrophobic, organic residue $R^1$ or —O—CO—R in which $R^1$ and R contain at least 6 carbon atoms.

17. The method according to claim 16, wherein the ceramic powder comprises zirconium dioxide; Me stands for aluminum or zirconium and n stands for 3 or 4; R' represents an alkyl residue having 1 to 4 carbon atoms; and Y represents a residue —O—CO—R, in which R stands for a hydrocarbon residue having 10 to 20 carbon atoms.

18. The method according to claim 16, wherein the ceramic powder comprises silicon carbide; Me stands for silicon and n stands for 4; R' stands for an alkyl residue having 1 to 4 carbon atoms; and Y represents a residue R' having a hydrocarbon structure and 10 to 20 carbon atoms.

* * * * *